United States Patent

Bauer et al.

[11] Patent Number: 5,989,331
[45] Date of Patent: *Nov. 23, 1999

[54] TIO₂ SLURRY STABILIZATION

[75] Inventors: Carl J. Bauer; John D. Boothe, both of Gonzales, Tex.; Frank S. Scimecca, Newtown, Pa.; Dwaine E. Siptak, Gonzales, Tex.

[73] Assignee: Southern Clay Products, Inc., Gonzales, Tex.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/861,589

[22] Filed: May 22, 1997

Related U.S. Application Data

[60] Provisional application No. 60/018,411, May 28, 1996.

[51] Int. Cl.⁶ ................ C09C 3/06; C09C 1/36; C04B 14/10
[52] U.S. Cl. ............ 106/444; 106/468; 106/462; 106/486; 106/487
[58] Field of Search ................ 106/444, 462, 106/468, 486, 487

[56] References Cited

U.S. PATENT DOCUMENTS

| | | |
|---|---|---|
| 3,702,773 | 11/1972 | Hall et al. . |
| 3,758,322 | 9/1973 | Roberts et al. . |
| 3,772,046 | 11/1973 | Knapp et al. . |
| 3,847,640 | 11/1974 | Daubenspeck et al. . |
| 4,042,557 | 8/1977 | Dills . |
| 4,177,081 | 12/1979 | DeColibus . |
| 4,288,254 | 9/1981 | Gladu . |
| 4,448,358 | 5/1984 | Menard . |
| 4,664,842 | 5/1987 | Knudson, Jr. et al. . |
| 4,695,402 | 9/1987 | Finlayson et al. . |
| 4,978,396 | 12/1990 | Story . |
| 5,110,501 | 5/1992 | Knudson, Jr. et al. . |
| 5,290,352 | 3/1994 | Krockert et al. . |
| 5,356,470 | 10/1994 | Ott et al. . |
| 5,393,510 | 2/1995 | Blumel et al. . |
| 5,700,319 | 12/1997 | Bauer et al. ............. 106/486 |

FOREIGN PATENT DOCUMENTS

| | | |
|---|---|---|
| 4-254408 | 9/1992 | Japan . |
| 1247361 | 7/1986 | U.S.S.R. . |
| 1733412 | 5/1992 | U.S.S.R. . |
| WO 94/20681 | 9/1994 | WIPO . |

*Primary Examiner*—David Brunsman
*Attorney, Agent, or Firm*—Klauber & Jackson

[57] ABSTRACT

A stable aqueous pigment slurry and a process for preparing same. The slurry contains about 50 to 90 wt. %, based on the weight of the slurry, of a pigment such as titanium dioxide and about 0.2 to 3.0 wt. %, based on the weight of the slurry, of a smectite clay such as bentonite, hectorite or montmorillonite. Preferably, the pigment slurry also contains about 0.1 to 2.0 wt. %, based on the weight of the slurry, of a dispersant. The process involves admixing a pigment slurry and a smectite clay slurry and preferably also the dispersant by milling the three components together under high shear conditions.

20 Claims, No Drawings

TIO₂ SLURRY STABILIZATION

CROSS-REFERENCE TO RELATED APPLICATION

This application is a continuation-in-part of provisional patent application Ser. No. 60/018,411 filed May 28, 1996.

FIELD OF THE INVENTION

The invention relates to stable aqueous pigment slurries and processes for preparing same. The stabilized pigment, e.g. $TiO_2$, slurries of the invention exhibit dramatically reduced syneresis and settling out.

BACKGROUND OF THE INVENTION

When any pigment such as $TiO_2$ is dispersed in water, there is a tendency for the pigment to immediately start to flocculate. One prior art approach to overcome such problem is to use surfactants. However, the present trend is to avoid, if at all possible, the use of surfactants. Guar gums have been used with some pigment slurries to help prevent settling. Although guar gums are helpful in reducing the settling-out problem, such approach is not efficient. Intermittent stirring in the storage tank is still required and the presence of the guar gums renders the slurry open to enzyme attack.

SUMMARY OF THE INVENTION

It has now been found that it is possible to prepare stable aqueous pigment slurries, especially $TiO_2$ slurries, which have a marked resistance to settling out and syneresis. The stable slurries of the invention do not require significant amounts of dispersants and need not be continuously or intermittently stirred to overcome settling-out and syneresis while in the storage tank.

The pigment slurries of the invention comprise an admixture of the pigment (preferably titanium dioxide) and a smectite clay. One or more dispersants are also preferably present to wet-out the pigment; however, syneresis and settling-out control are not as dependent on the dispersant when a smectite clay is present.

DETAILS OF THE INVENTION

The invention encompasses a stable aqueous pigment slurry comprising an admixture of about 50 to 90 wt. %, preferably 60 to 85 wt. %, based on the weight of the slurry of a pigment and about 0.2 to 3 wt. %, preferably 0.5 to 2.5 wt. %, based on the weight of the slurry, of a smectite clay. Preferably, the smectite clay is a naturally-occurring or synthetic bentonite, hectorite or montmorillonite clay.

Preferably, the pigment comprises titanium dioxide which is present in an amount of 60 to 85 wt. %, based on the weight of the slurry.

The average particle size of the smectite clay in the final slurry will typically be in the range of about 0.025 to 1.0µ, and the average particle size of the titanium dioxide in the final slurry will typically be in the range of about of about 0.25 to 0.5µ. Such average particle size ranges may be achieved by admixing the titanium dioxide with the smectite clay and milling the admixture under high shear conditions, as more particularly described below.

Preferably, the pigment slurry will also contain one or more dispersants, present in an amount of about 0.1 to 2.0 wt. %, based on the weight of the slurry. Useful dispersants include alkali polyphosphates, aliphatic carboxylic acids and alkali salts thereof, polyacrylic acids and alkali salts thereof, polyhydroxy alcohols, amino alcohols and mixtures thereof.

The stable pigment slurry of the invention is preferably prepared by admixing the pigment, e.g. titanium dioxide, with an aqueous slurry of the smectite clay containing 5 to 20 wt. % and preferably 8 to 12 wt. % of smectite clay based on the weight of the aqueous smectite clay slurry. Such admixing is readily accomplished by milling (or grinding) the components under conditions such that the average particle size of the smectite in the final slurry will be in the range of about 0.025 to 1.0µ, and the average particle size of the titanium dioxide in the final slurry will be in the range of about of about 0.2 to 0.5µ. Suitable admixing techniques for achieving such average particle sizes are well known in the prior art, e.g. mechanical grinding, steam milling, micronization, high shear milling, ball milling, pug milling, disc milling, dispersion, colloidal milling, Manton-Gaulin milling, horizontal media milling, etc.

The invention is illustrated by the following Example which to be considered as illustrative and not delimiting of the invention otherwise described.

EXAMPLE 1

A titanium dioxide slurry having 76.2 wt. % solids was admixed with the smectite clay slurries (10 wt. % solids) in the weight %, based on the weight of the final slurry, indicated in Formulation I below. "Gelwhite L" is a smectite clay of the montmorillonite type available from Southern Clay Products, Inc.; it is a fine powder having a GEB brightness of 83, a moisture content of 10%, a pH of 9.0 and a viscosity of 525 cps (10% solids, Brookfield, 20 RPM). "Bentolite L-10" is a naturally occurring off-white calcium bentonite having a moisture content of 8%, a pH of 7.5 (10% slurry) and a loose bulk density of 30.0 lb/ft³. "HSD" signifies high shear dispersing; "M-G" signifies milling by hand using the Manton-Gaulin mill.

FORMULATION I

| No. | Smectite | Weight % Smectite | Mixing Process |
| --- | --- | --- | --- |
| A | None | None | 2600 rpm, 40 mm blade, HSD, 5 min |
| B | Gelwhite L | 1 | 3000 rpm, 40 mm blade, HSD, 5 min |
| C | Gelwhite L | 1 | 3000 rpm, 40 mm blade, HSD, 5 min then hand M-G |
| D | Gelwhite L | 2 | 4000 rpm, 40 mm blade, HSD, 5 min |
| E | Gelwhite L | 1 | 3000 rpm, 40 mm blade, HSD, 5 min |
| F | Gelwhite L | 1 | 3000 rpm, 40 mm blade, HSD, 5 min then hand M-G |
| G | Gelwhite L | 1 | 3000 rpm, 40 mm blade, HSD, 5 min |
| X | Bentolite L-10 | 1 | 3000 rpm, 40 mm blade, HSD, 5 min |

The Formulation I slurries were examined for syneresis at 55° C. after 10 and 27 days and contrast ratios and y reflectance values of paint formulations prepared from the slurries. The results are shown in Table I.

TABLE I

| | Syneresis, % | | Contrast | y Reflectance |
| --- | --- | --- | --- | --- |
| No. | 10 days | 26 days | Ratio, % | Value |
| A | 8.93 | 12.5 | 97.98 | 94.14 |
| B | 0.00 | 0.00 | 98.38 | 94.40 |
| C | 0.00 | 0.00 | 98.49 | 94.70 |
| D | 0.00 | 0.00 | 100.00 | 96.79 |
| E | 0.00 | 0.00 | 98.65 | 95.07 |
| F | 0.00 | 0.00 | 98.74 | 95.01 |
| G | 1.85 | 5.61 | 98.62 | 94.71 |
| X | <1.00 | <1.00 | 98.76 | 95.07 |

EXAMPLE II

A titanium dioxide slurry was prepared from the ingredients set forth in Formulation II below. "Polywet ND-2" is an anionic dispersant obtained from Uniroyal Corporation. "Bubblebreaker 748" is a silicone defoamer.

| FORMULATION II | |
|---|---|
| Ingredient | Weight, grams |
| Water | 210.18 |
| NaOH | 0.23 |
| Potassium tripolyphosphate | 3.00 |
| Polywet ND-2 | 2.13 |
| Bubblebreaker 748 | 0.06 |
| Thickener | As indicated in Table II |
| Biocide | 0.39 |
| Titanium dioxide | 354.00 |

Paint formulations were prepared from the Formulation II slurries by adding 100 grams of the slurry to 59.0 grams of paint base and mixed. The paint base consisted of 40.0 grams of "UCAR 376" Latex resin, a vinyl-acrylic resin obtained from Union Carbide Corporation; 1.4 grams of "Texanol" (a high molecular weight alcohol); 0.3 gram of "Bubblebreaker 748"; 0.3 gram of "Triton CF-10" (a nonionic surfactant having an HLB value of about 13); and 17.0 grams of water. Paint formulations employing Formulations III, IV and V described below were prepared in the same manner. Table II set forth below contains the results obtained from the use of Formulation II.

EXAMPLE 3

A titanium dioxide slurry was prepared from the ingredients set forth in Formulation III below. "Tamol 1124" is a sodium carboxylate dispersant and "AMP 95" is 2-amino-2-methyl-1-propanol.

| FORMULATION III | |
|---|---|
| Ingredient | Weight, grams |
| Water | 140.60 |
| Thickener | As indicated in Table III |
| Tamol 1124 | 0.53 |
| AMP 95 | 1.28 |
| Titanium dioxide | 450.00 |

The ingredients in Formulation III were mixed on a high-speed disperser for 10 minutes and thereafter were dispersed in a media mill for 30 minutes (1,000 rpm) using glass beads. Table III set forth below contains the results obtained from the use of Formulation III.

TABLE II

| Sample | Thickener/ Amount | Brookfield Viscosity, 60 rpm #3 spindle | % Syneresis, 10 days, 50° C. | % Syneresis/ Settling, 34 days, 50° C. | Hegman Grind | Contrast Ratio | Reflectance Value |
|---|---|---|---|---|---|---|---|
| A | BTLT/0.0054% | 362 | 1.5 | <2.0/some | 7.5+ | 97.85 | 93.13 |
| B | BTLT/1.0% | 10,000+ | 0 | 0/none | 7+ | 99.35 | 95.33 |
| C | BTLT/0.5% | 2,650 | 0 | 0/none | 7.5+ | 99.54 | 95.05 |
| D | BTLT/0.25% | 960 | 0 | 0/none | 7.5+ | 99.66 | 95.06 |
| E | None | 200 | 3.5 | 5/severe | 7.5+ | 98.10 | 93.57 |
| AA | BTLT/0.0054% | 204 | 1.5 | 5/some | 7.5+ | 98.49 | 94.26 |
| BB | BL10/1.0% | 470 | 1 | <1/none | 7.5+ | 99.45 | 95.25 |
| CC | BL10/0.5% | 300 | 2.0 | <2/some | 7.5+ | 99.10 | 94.74 |
| DD | BL10/0.25% | 224 | 3.3 | 3/severe | 7.5 | 98.98 | 94.59 |
| EE | BL10/0.5% | 320 | 1.7 | <2/some | 7.5+ | 99.56 | 94.99 |
| FF | BL10/0.0054% | 252 | 3.2 | 3.2/severe | 7.5+ | 98.41 | 94.16 |
| GG | BL10/1.5% | 594 | 0.5 | 0/none | 7.5+ | 99.37 | 96.54 |
| HH | BL10/1.75% | 736 | 0 | 0/none | 7.5+ | 99.13 | 96.13 |

All percentages of thickener are based on the weight of titanium dioxide added to the slurry, not the entire slurry weight.
"BTLT" is a 50:50 blend of hectorite and hydroxyethylcellulose.
"BL10" is a naturally occurring off-white calcium bentonite having a moisture content of 8%, a pH of 7.5 (10% slurry) and a loose bulk density of 30.0 lb/ft$^3$.

TABLE III

| Sample | Thickener/ Amount | Brookfield Viscosity, 60 rpm #3 spindle | % Syneresis, 10 days/30 days, 50° C. | Settling, 30 days, 50° C. | Hegman Grind | Contrast Ratio | Reflectance Value |
|---|---|---|---|---|---|---|---|
| 183A | BT10/1% | 650 | 0/0 | some | 7.5+ | 98.66 | 94.21 |
| 183B | BL10/0.5% | 316 | 1/1 | some | 7.5+ | 98.68 | 94.51 |
| 183C | BL10/0.75% | 346 | 0.5/0.5 | some | 7.5+ | 98.87 | 94.49 |
| 183D | BL400/1% | 356 | 0/0 | some | 7.5+ | 97.87 | 93.80 |

TABLE III-continued

| Sample | Thickener/ Amount | Brookfield Viscosity, 60 rpm #3 spindle | % Syneresis, 10 days/30 days, 50° C. | Settling, 30 days, 50° C. | Hegman Grind | Contrast Ratio | Reflectance Value |
|---|---|---|---|---|---|---|---|
| 183E | BLWH/0.5% | 500 | 0.5/0.5 | slight | 7.5+ | 98.50 | 94.27 |
| 183F | BLWH/0.75% | 740 | 0/0 | slight | 7.5+ | 98.25 | 92.76 |
| 183G | BL400/0.75% | 278 | 1/0.5 | some | 7.5+ | 98.41 | 94.20 |
| 184A | 3X/0.5% | 430 | 0/0 | some | 7.5+ | 98.79 | 94.77 |
| 184B | SCPX944/0.5% | 524 | 0/0 | some | 7.5+ | 99.77 | 94.67 |
| 184C | 3X/0.75% | 646 | 1.7 | some | 7.5+ | 99.78 | 94.60 |
| 182A-1 | None | 166 | 8.6/8.7 | hard | 7.5+ | 98.79 | 94.58 |
| 001D | None | 174 | 11.7/20.3 | hard | 7.5+ | 94.31 | 91.62 |

All percentages of thickener are based on the weight of titanium dioxide added to the slurry, not the entire slurry weight.
"BL10" is a naturally occurring off-white calcium bentonite having a moisture content of 8%, a pH of 7.5 (10% slurry) and a loose bulk density of 30.0 lb/ft$^3$.
"BLWH" is a sodium ion-exchanged version of BL10.
"BL400" is a micronized version of BLWH.
"3X" is a Wyoming bentonite slurry milled 3 times in a Manton-Gaulin mill.
"SCPX" is 3X treated with a quaternary ammonium compound.

EXAMPLE 4

A titanium dioxide slurry was prepared from the ingredients set forth in Formulation IV below.

FORMULATION IV

| Ingredient | Weight, grams |
|---|---|
| Water | 140.6 |
| Thickener | As indicated in Table IV |
| Tamol 1124 | 0.9 |
| Potassium tripolyphosphate | 0.6 |
| AMP 95 | 1.5 |
| Bubblebreaker 748 | 0.6 |
| Titanium dioxide | 350.0 |

The ingredients in Formulation IV were mixed on a high-speed disperser for 10 minutes and thereafter were dispersed in a media mill for 30 minutes (1,000 rpm) using glass beads. Table IV set forth below contains the results obtained from the use of Formulation IV.

EXAMPLE 5

Titanium slurries were prepared to illustrate the effect of different dispersants. The ingredients are shown in Formulation 5:

FORMULATION 5

| Ingredient | Weight, grams |
|---|---|
| Water | 140.6 |
| AMP 95 | 1.3 |
| Dispersant | As indicated in Table V |
| Titanium dioxide | 450.0 |
| BL10 | As indicated in Table V |

The ingredients in Formulation IV were mixed on a high-speed disperser for 10 minutes and thereafter were dispersed in a media mill for 30 minutes (1,000 rpm) using glass beads. Table V set forth below contains the results obtained from the use of Formulation V.

TABLE IV

| Sample | Thickener/ Amount | Brookfield Viscosity, 60 rpm #3 spindle | % Syneresis, 10 days/31 days, 50° C. | Settling, 31 days, 50° C. | Hegman Grind | Contrast Ratio | Reflectance Value |
|---|---|---|---|---|---|---|---|
| 185A | BL10/0.64% | 858 | 0/0 | none | 7+ | 96.11 | 90.25 |
| 185B | BL10/0.32% | 880 | 0/0 | none | 7+ | 96.54 | 90.50 |
| 185C | BL10/0.96% | 860 | 0/0 | none | 7+ | 97.47 | 91.52 |
| 185D | BLWH/0.64% | 1,028 | 0/0 | none | 7+ | 97.22 | 91.17 |
| 185E | BLWH/0.32% | 948 | 0/0 | none | 7+ | 97.00 | 91.24 |
| 185F | BL400/0.64% | 832 | 0/0 | none | 7+ | 97.00 | 91.09 |
| 185G | BL400/0.96% | 888 | 0/0 | none | 7+ | 96.93 | 91.27 |
| 185H | 3X/0.64% | 1,240 | 0/0 | none | 7+ | 97.78 | 92.03 |
| 185I | 3X/0.32% | 1,014 | 0/0 | none | 7+ | 96.55 | 90.86 |
| 185J | None | 1,318 | 0/0 | none | 7+ | 97.03 | 91.51 |
| 185K | None | 1,040 | 0/0 | none | 7+ | 96.34 | 90.67 |
| 185L | None | 602 | 0/0 | none | 7+ | 96.04 | 90.27 |
| 185M | SCPX944/0.25% | 1,712 | 0/0 | none | 7 | 97.41 | 91.32 |
| 185N | BL10/0.64% | 932 | 0/0 | none | — | — | — |
| 185O | BLWH/0.32% | 948 | 0/0 | none | — | — | — |
| 001C | BL10/1.0% | 610 | 8.3/12.7 | slight | 7 | 96.37 | 93.59 |
| 001E | None | 270 | 18.5/25.5 | hard | 7 | 90.12 | 87.06 |

All percentages of thickener are based on the weight of titanium dioxide added to the slurry, not the entire slurry weight.

TABLE V

| Sample | Surfactant/ Amount, grams | Thickener/ Amount, grams | Brookfield Visc., 60 rpm, #3 | % Syneresis 10 days/20 days, 50° C. | Settling 20 days, 50° C. |
|---|---|---|---|---|---|
| 190A | TSG-1/0.71 | none | 226 | 3.4/5.1 | slight |
| 190E | TSG-1/1.42 | none | 972 | — | — |
| 190H | TSG-1/0.71 | BL10/2.25 | 988 | <0.5/<0.5 | none |
| 190B | S104/0.52 | none | 112 | 7/8.6 | some |
| 190F | S104/1.04 | none | 564 | — | — |
| 190G | S104/0.52 | BL10/2.25 | 958 | 0.5/0 | none |
| 190C | T165/1.14 | none | 192 | 5.6/4.6 | slight |
| 190D | T165/2.28 | none | 374 | — | — |
| 190I | T165/1.14 | BL10/2.25 | 908 | 0/0 | none |

"TSG-1" is "Tamol SG-1", an anionic surfactant.
"S-104" is "Surfonyl", a hydrophobic surfactant.
"T165" is "Tamol 165", a nonionic surfactant.

What is claimed is:

1. A stable aqueous pigment slurry comprising an admixture of:
   (a) about 50 to 90 wt. %, based on the weight of the slurry, of a pigment; and
   (b) about 0.2 to 3.0 wt. %, based on the weight of the slurry, of a smectite clay.

2. The slurry of claim 1 further comprising about 0.1 to 2.0 wt. %, based on the weight of the slurry, of a dispersant.

3. The slurry of claim 2 wherein the dispersant is selected from the group consisting of alkali polyphosphates, aliphatic carboxylic acids and alkali salts thereof, polyacrylic acid and alkali salts thereof, polyhydroxy alcohols, amino alcohols and mixtures thereof.

4. The slurry of claim 1 wherein the pigment is present in an amount of 60 to 85 wt. %, based on the weight of the slurry.

5. The slurry of claim 1 wherein the pigment comprises titanium dioxide.

6. The slurry of claim 4 wherein the average particle size of the titanium dioxide is in the range of about 0.2 to 0.5μ.

7. The slurry of claim 1 wherein the smectite clay is present in an amount of 0.5 to 2.5 wt. %, based on the weight of the slurry.

8. The slurry of claim 1 wherein the average particle size of the smectite clay is in the range of about 0.025 to 1.0μ.

9. The slurry of claim 1 wherein the smectite clay is selected from the group consisting of bentonite, hectorite and montmorillonite clays.

10. A process for preparing a stable aqueous pigment slurry which comprises admixing about 50 to 90 wt. %, based on the weight of the pigment slurry, of a pigment with about 0.2 to 3.0 wt. %, based on the weight of the pigment slurry, of a smectite clay, said smectite clay being present in the form of an aqueous smectite clay slurry containing about 5 to 20 wt. % smectite clay, based on the weight of the aqueous smectite clay slurry.

11. The process of claim 10 wherein about 0.1 to 2.0 wt. %, based on the weight of the pigment slurry, of a dispersant is also present during the admixing.

12. The process of claim 11 wherein the dispersant is selected from the group consisting of alkali polyphosphates, aliphatic carboxylic acids and alkali salts thereof, polyacrylic acid and alkali salts thereof, polyhydroxy alcohols, amino alcohols and mixtures thereof.

13. The process of claim 10 wherein the pigment is present in an amount of 60 to 85 wt. %, based on the weight of the pigment slurry.

14. The process of claim 10 wherein the pigment comprises titanium dioxide.

15. The process of claim 10 wherein the smectite clay is present in the aqueous smectite clay slurry in an amount of 8 to 12 wt. %, based on the weight of the aqueous smectite clay slurry.

16. The process of claim 10 wherein the smectite clay is present in an amount of 0.5 to 2.5 wt. %, based on the weight of the pigment slurry.

17. The process of claim 10 wherein the admixing of the pigment, dispersant and aqueous smectite clay slurry is accomplished by milling under high shear conditions.

18. The process of claim 17 wherein the pigment comprises titanium dioxide and the milling is carried out such that the average particle size of the titanium dioxide is in the range of about 0.2 to 0.5μ.

19. The process of claim 10 wherein the milling is carried out such that the average particle size of the smectite clay is in the range of about 0.025 to 1.0μ.

20. The process of claim 10 wherein the smectite clay is selected from the group consisting of bentonite, hectorite and montmorillonite clays.

* * * * *